Dec. 3, 1946.  L. DOMINE  2,411,852

BUMPER

Filed April 10, 1945

INVENTOR.
Leo Domine
BY
Attorney.

Patented Dec. 3, 1946

2,411,852

UNITED STATES PATENT OFFICE 2,411,852

BUMPER

Leo Domine, Detroit, Mich.

Application April 10, 1945, Serial No. 587,491

1 Claim. (Cl. 267—28)

This invention relates to improvements in bumpers, and refers particularly to bumpers to be mounted between a vehicle frame and an axle to limit the action of the spring.

It is an object of the invention to provide such a bumper including a resilient disc mounted in a cup which is secured to one extremity of the spring and means upon the other extremity of the latter for supporting the bumper upon an axle.

Another object of the invention is to provide such a bumper wherein the construction is simplified and cheapened by making the disc of resilient stock, preferably laminated material consisting of alternate layers or rubber and fabric, and a cup the annular margin of which is inwardly pressed to engage the lower portion of the circumference of the disc, and to form a central depression in the bottom of the cup to receive the head of a bolt which extends downward through an opening in the latter and passes through an inverted cup the annular margin of which rests against the underside of the top coil of the spring to retain the disc and cup firmly in position upon the said top coil.

With these and other objects in view to both cheapen and simplify the production and assembly of the bumper, my invention is hereinafter more fully described with the aid of the accompanying drawing, in which.

Figure 1:
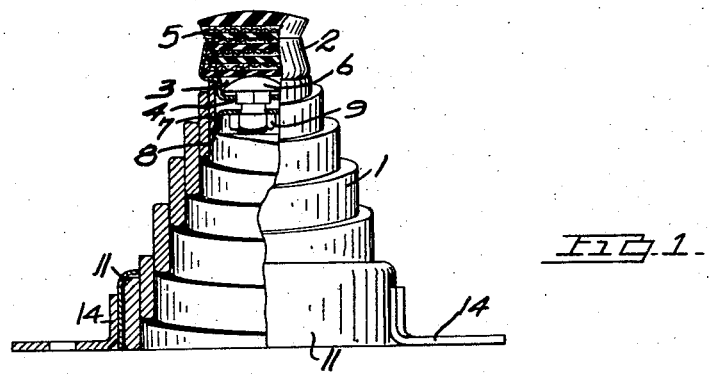
Figure 1 is a side view partly in section showing the bumper.
Figure 2:
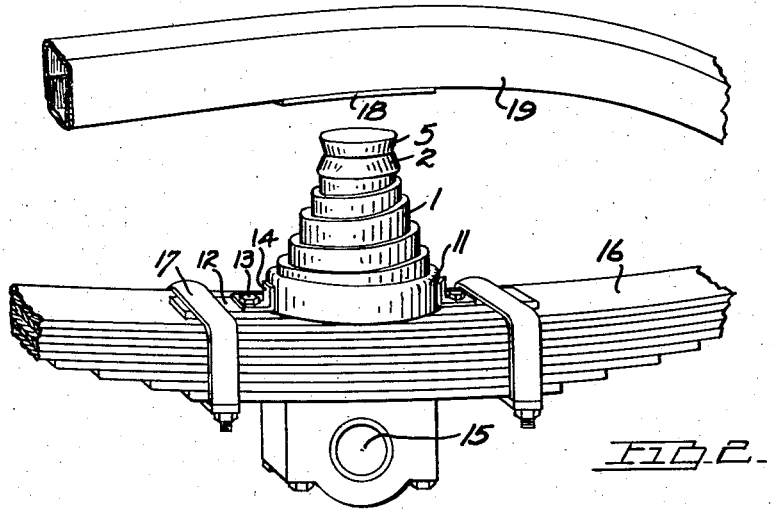
Figure 2 is a perspective view showing the bumper in position on a vehicle.

Referring to the drawing, 1 designates a coil spring of larger diameter at its lower end and of constantly decreasing diameter toward its upper end; moreover the outer margins of the top and bottom coils of the spring are parallel. 2 denotes a cup having a central depression 3 which is centrally apertured at 4. The cup 2 rests upon the top coil of the spring 1 and the outer periphery of the depression 3 is contiguous to the inner side of the said top coil. Seated in the cup and projecting upwardly therefrom is a resilient disc 5 which may be made of laminated material consisting of alternate layers of rubber composition and fabric. The periphery of the cup 2, the height of which is less than that of the disc 5, is inwardly pressed to grip the outer periphery of the said disc and force the upper face of the latter to assume a substantially convex form. Seated in the depression 3 is the head of a carriage bolt 6 which extends through the aperture 4 so that the sides of the latter hold the multi-sided portion of the carriage bolt immediately beneath its head and prevent rotation of the bolt. Arranged to project upwardly in the top coil of the spring 1 is an inverted cup 7 having an annular flange 8 which bears against the underside of the said top coil around substantially its entire circumference. The bolt 6 extends through a central opening formed in the base of the inverted cup 7 and has a nut 9 tightened on its lower extremity by which the cup 2 is rigidly secured upon the top coil of the spring 1. It will be noted that the depth of the inverted cup 7 is such that the nut 9 and the bottom of the bolt 6 are located entirely above the bottom of the said top coil so that should the spring be momentarily flattened neither the bolt nor nut will contact the surface beneath the spring.

11 denotes a retaining ring having its upper annular margin inwardly bent to extend over the upper margin of the bottom coil of the spring 1 around substantially the entire circumference of the latter. This ring 11 and the spring 1 are seated upon a suitable pad 12 and are secured thereon by screws 13 which extend through lugs 14 made integral with the said ring 11.

On different makes of vehicles the bumper may be mounted in various ways upon the axle 15, either directly thereon, or upon the central portion of a spring 16 which is in turn secured to the said axle in any conventional manner. In the present instance the pad 12 is held securely upon the top of the spring 16 by suitable straps 17. Meanwhile the convex upper face of the disc 5 is positioned to suitably engage a contact plate 18 secured to a portion of the frame 19 of the vehicle to limit the downward movement of the latter.

Thus the disc 5 may be readily cut from any flat sheet of resilient material, which, while it may consist wholly of rubber may also be made of laminated material consisting of alternate layers of rubber composition and fabric. The cup 2 may be easily stamped out and its side subsequently pressed inwardly to firmly engage the disc 5; and the central depression in the cup provides space to receive the head of the bolt 6 which then also forms a bearing for the central portion of the underside of the disc which is also annularly supported by the underside of the cup.

While in the foregoing the preferred embodiment of the invention has been described and shown, it is understood that alterations and modifications may be made thereto provided the said alterations and modifications fall within the scope of the appended claim.

What I claim is:

A bumper including a coil spring the diameter of which increases progressively from top to bottom, a cup on the top coil of the spring having a central depression formed therein seated within said top coil, a resilient disc seated in said cup and projecting above the top of the latter, said disc being securely held by the annular margin of the cup, a bolt the head of which is heated in said central depression, said bolt extending downward through an opening formed in the base of the cup, an inverted cup extending upwardly in the top coil of the spring from its underside, an annular flange on said inverted cup bearing against the underside of the top coil of the spring, said bolt extending through a central opening formed in said inverted cup, and a nut in the latter in threaded engagement with said bolt, said bolt and nut terminating above the underside of the top coil of the spring.

LEO DOMINE.